(12) United States Patent
Lee et al.

(10) Patent No.: US 8,243,668 B2
(45) Date of Patent: Aug. 14, 2012

(54) METHOD FOR ALLOCATING RADIO RESOURCE IN WIRELESS COMMUNICATION SYSTEM AND METHOD FOR TRANSMITTING OR RECEIVING DATA USING THE SAME

(75) Inventors: Wook Bong Lee, Anyang-si (KR); Bin Chul Ihm, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 229 days.

(21) Appl. No.: 12/452,615

(22) PCT Filed: Jul. 9, 2008

(86) PCT No.: PCT/KR2008/004045
§ 371 (c)(1),
(2), (4) Date: Jan. 12, 2010

(87) PCT Pub. No.: WO2009/011513
PCT Pub. Date: Jan. 22, 2009

(65) Prior Publication Data
US 2010/0118991 A1      May 13, 2010

Related U.S. Application Data

(60) Provisional application No. 60/970,530, filed on Sep. 6, 2007, provisional application No. 60/977,643, filed on Oct. 4, 2007, provisional application No. 60/978,736, filed on Oct. 9, 2007.

(30) Foreign Application Priority Data

Jul. 13, 2007  (KR) .................. 10-2007-0070763
Nov. 5, 2007   (KR) .................. 10-2007-0111979

(51) Int. Cl.
*H04W 4/00* (2009.01)
(52) U.S. Cl. ..................................................... 370/329
(58) Field of Classification Search .................. 370/329
See application file for complete search history.

(56) References Cited

U.S. PATENT DOCUMENTS

2005/0058089 A1*  3/2005  Vijayan et al. ................. 370/312
2005/0286408 A1* 12/2005  Jin et al. ......................... 370/208
2006/0007849 A1   1/2006  Kim et al.

FOREIGN PATENT DOCUMENTS

KR    10-2006-0004142 A    1/2006
* cited by examiner

*Primary Examiner* — Gary Mui
*Assistant Examiner* — Richard K Chang
(74) *Attorney, Agent, or Firm* — McKenna Long & Aldridge LLP

(57) ABSTRACT

A method for allocating a radio resource in a wireless communication system comprises defining a plurality of resource regions within a frame, a resource region comprising at least one orthogonal frequency division multiple access (OFDMA) symbol and at least one subchannel, configuring radio resource allocation information indicating which resource region selected from the plurality of resource regions is allocated to a UE, the radio resource allocation information comprising at least one resource region identifier (ID), a resource region ID indicating a resource region selected from the plurality of resource regions, and transmitting the radio resource allocation information to the UE.

8 Claims, 11 Drawing Sheets

[Fig. 1]
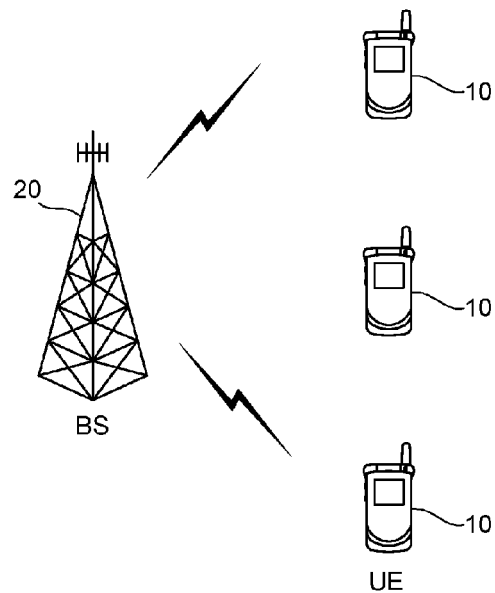
[Fig. 2]
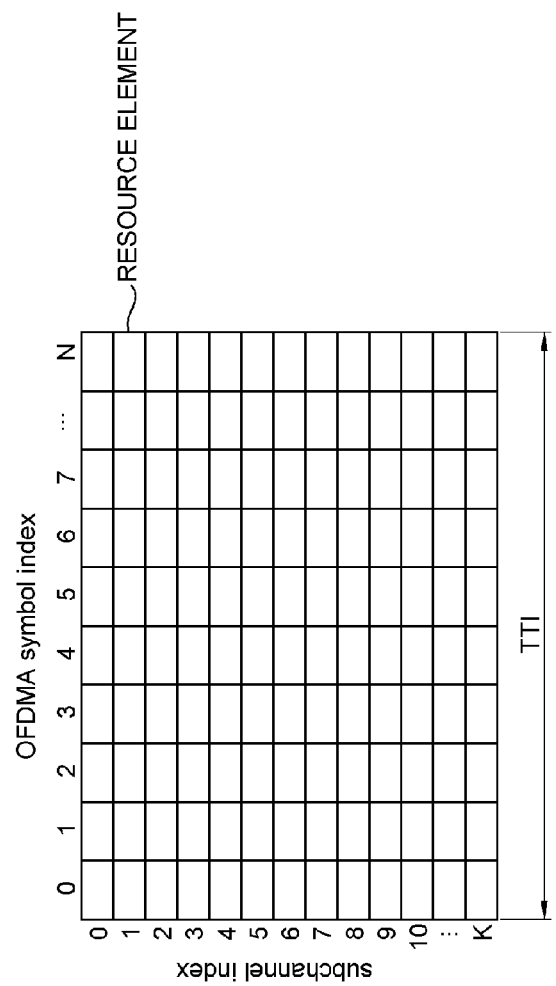

[Fig. 3]
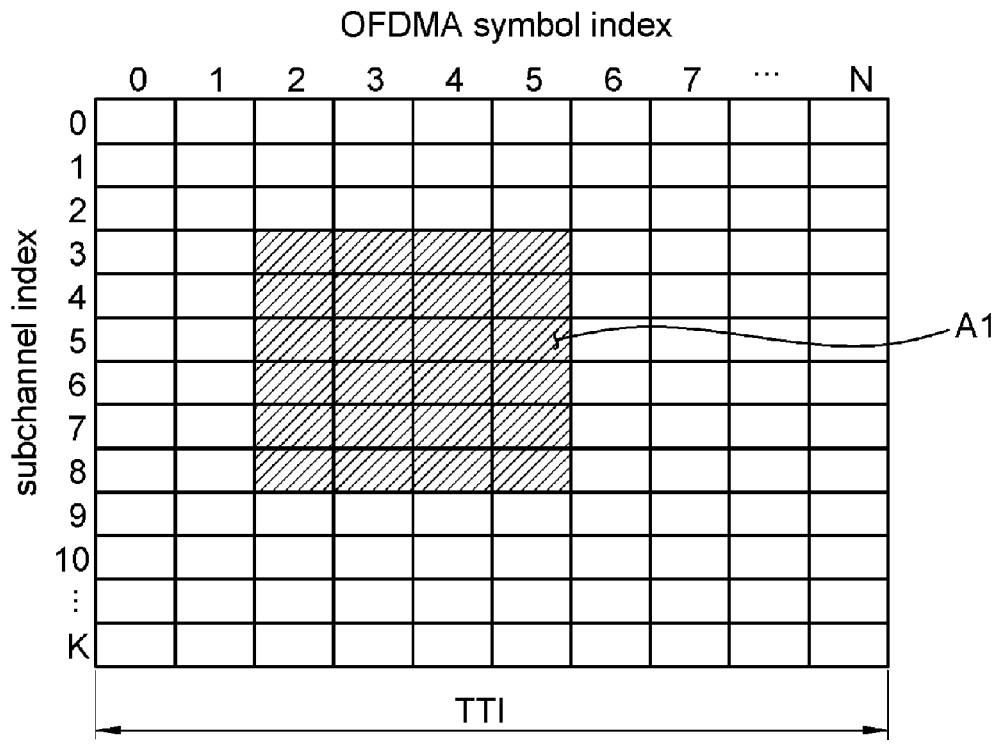
[Fig. 4]
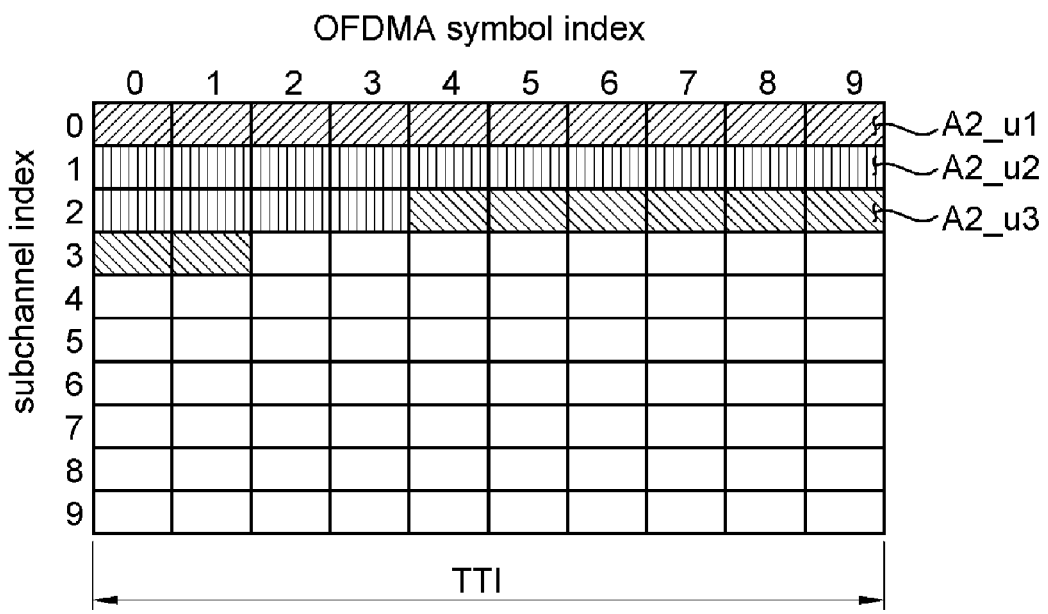

[Fig. 5]
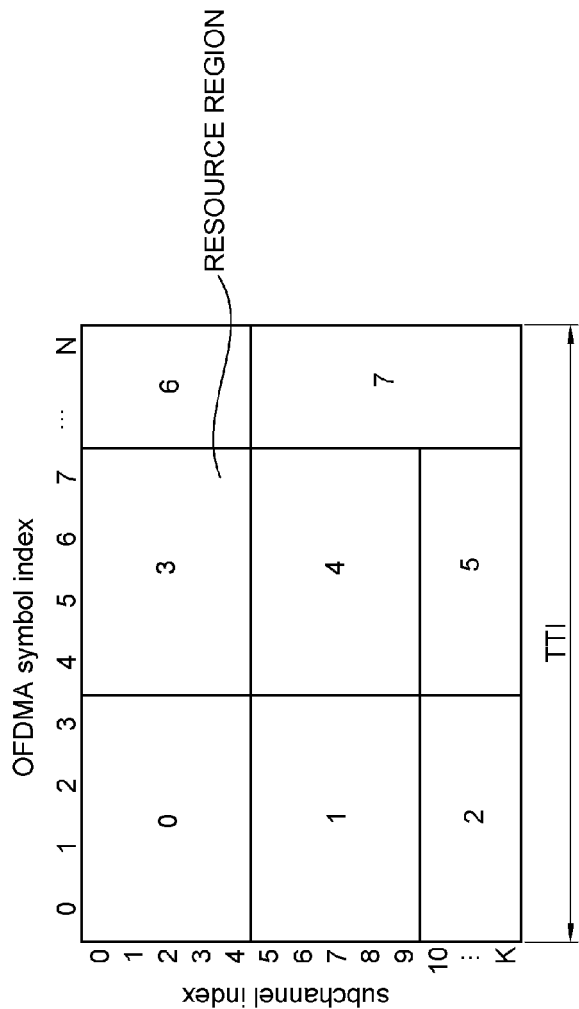
[Fig. 6]
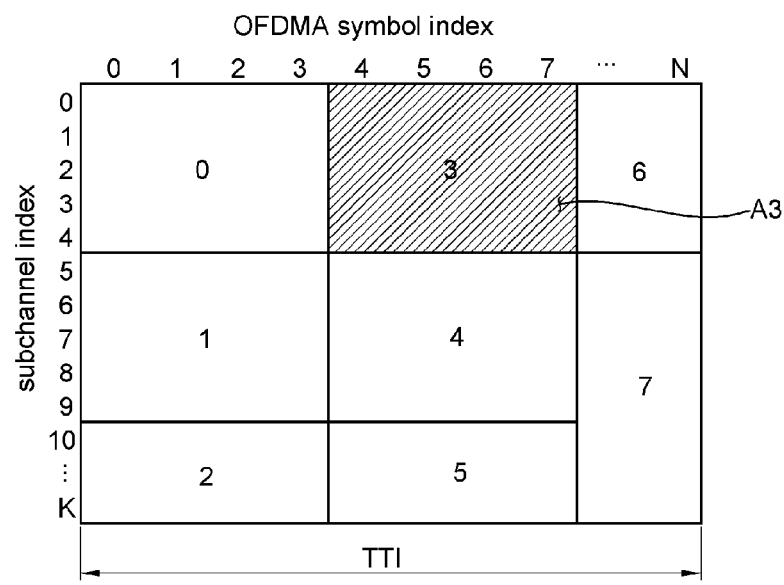

[Fig. 7]
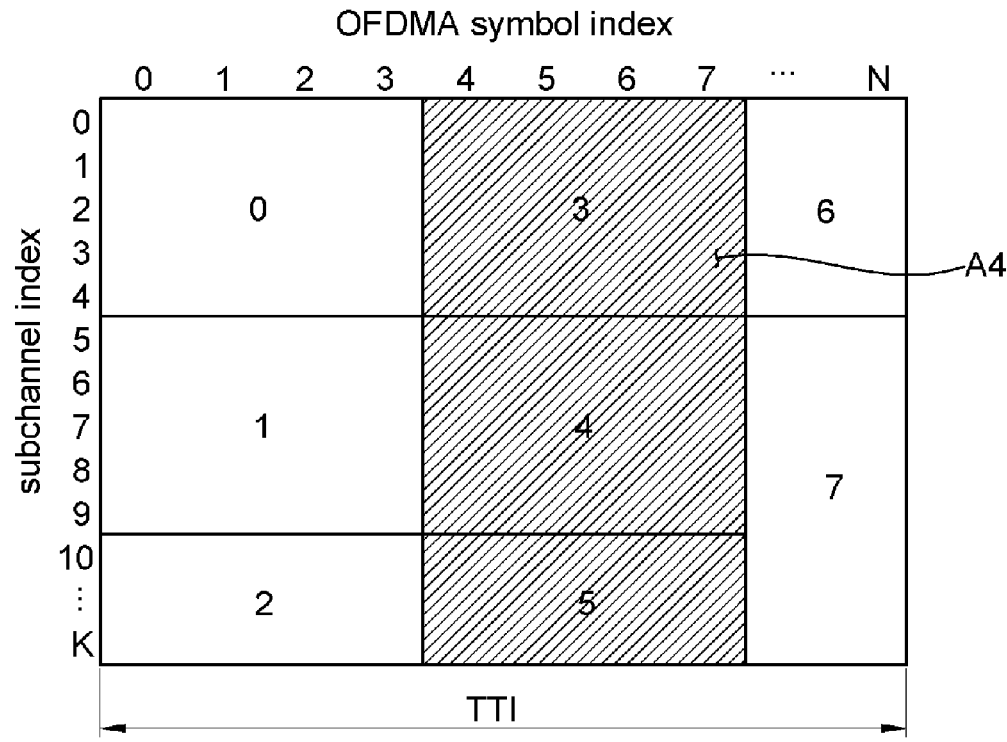
[Fig. 8]
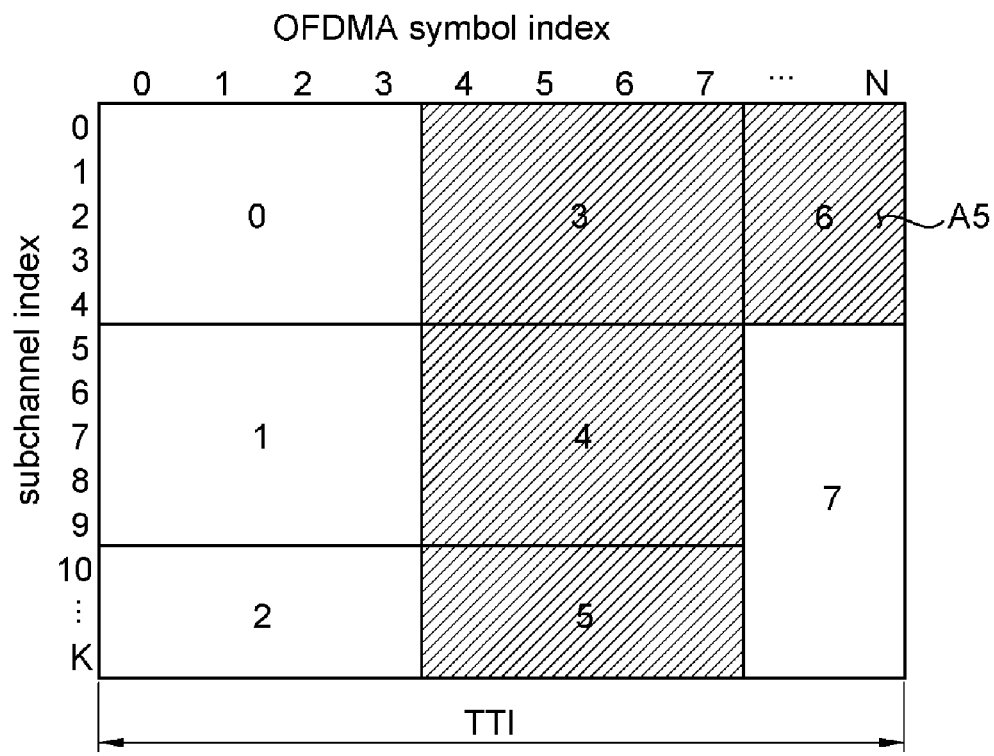

[Fig. 9]
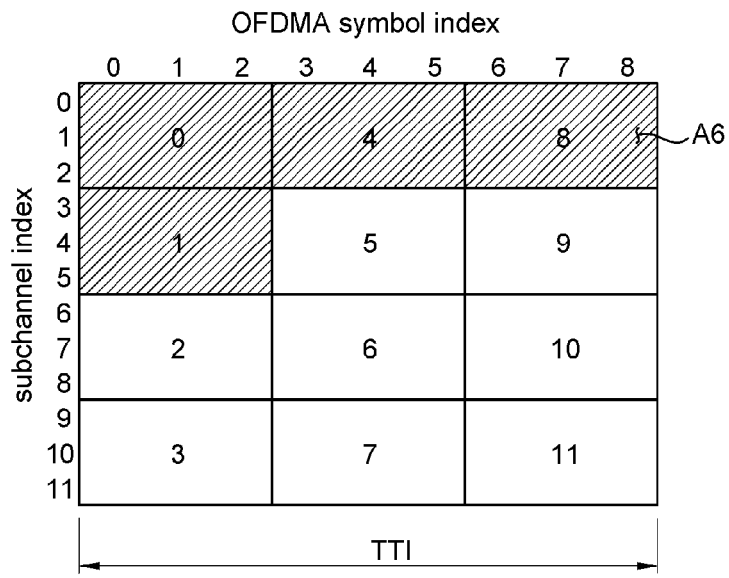
[Fig. 10]
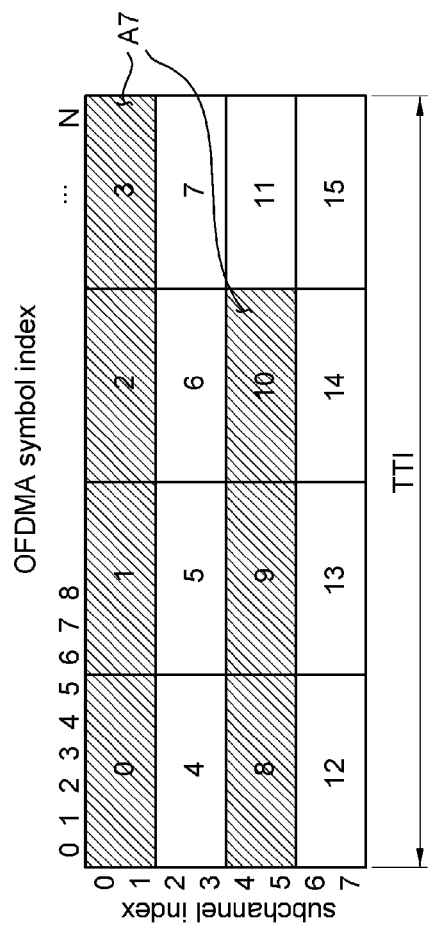

[Fig. 11]
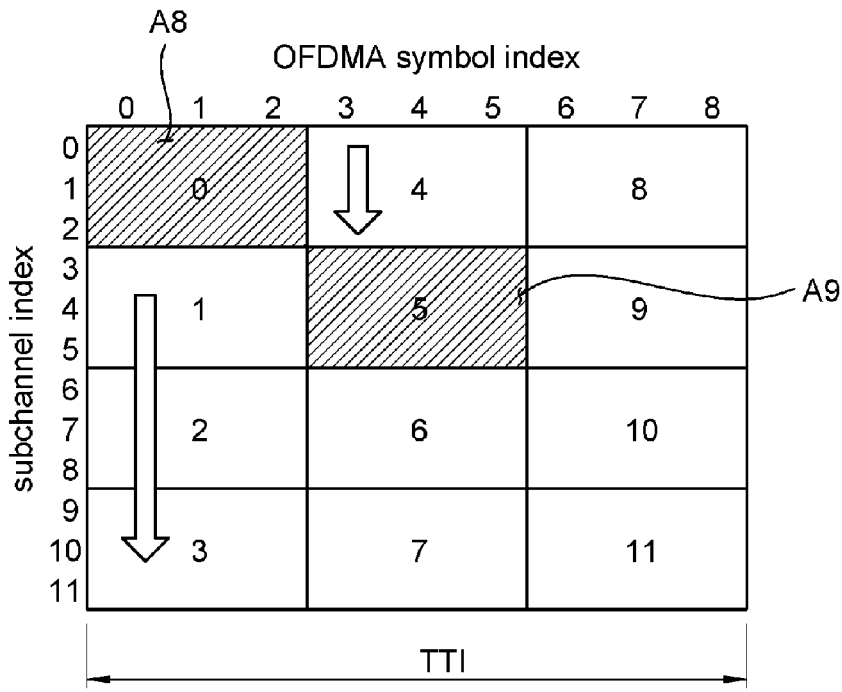
[Fig. 12]
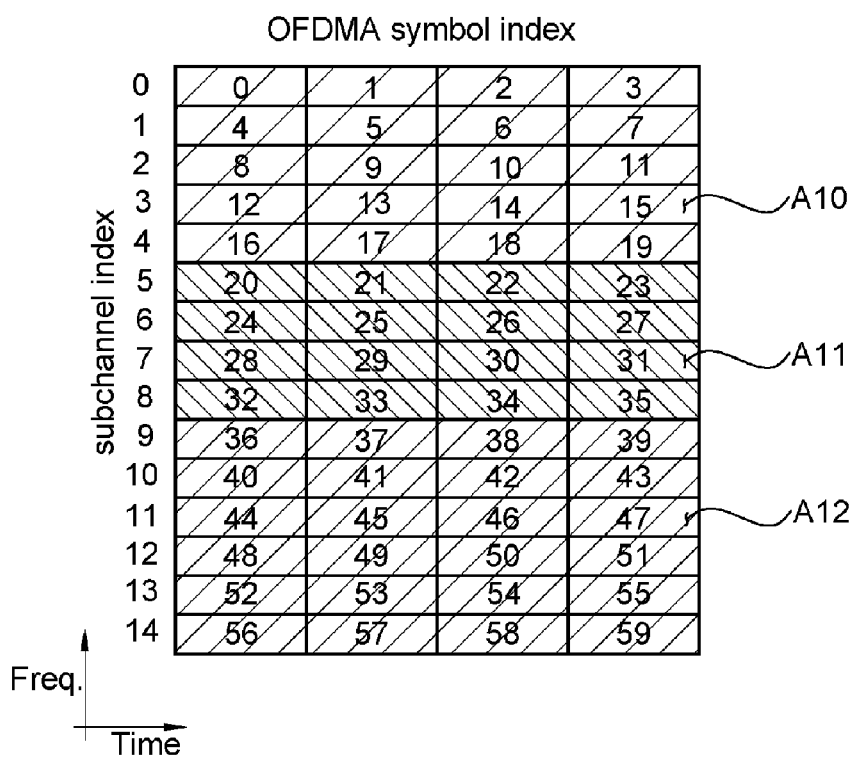

[Fig. 13]
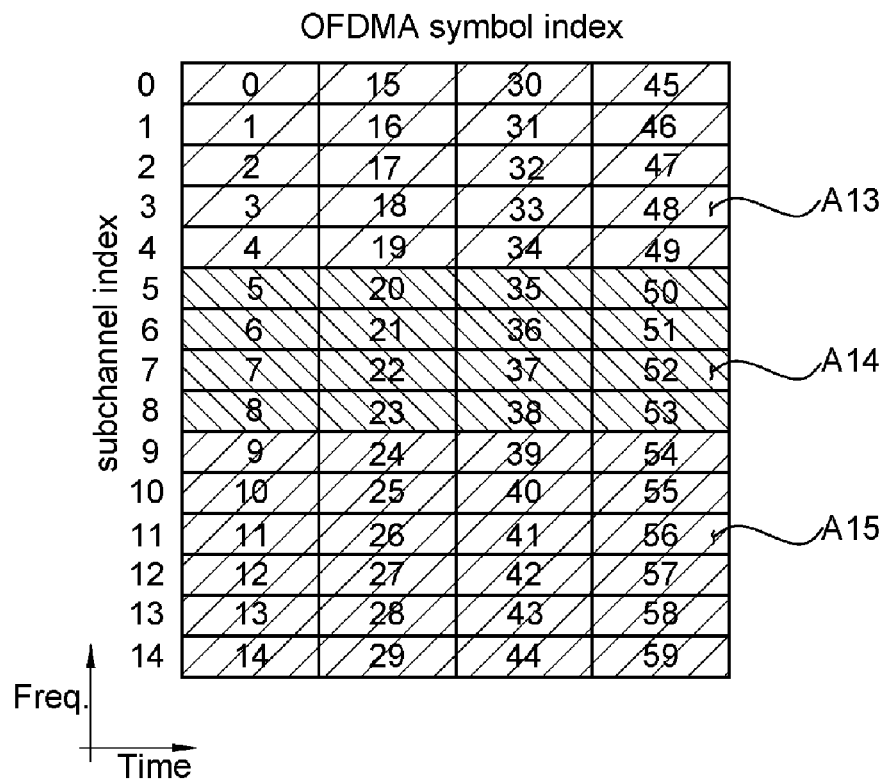
[Fig. 14]
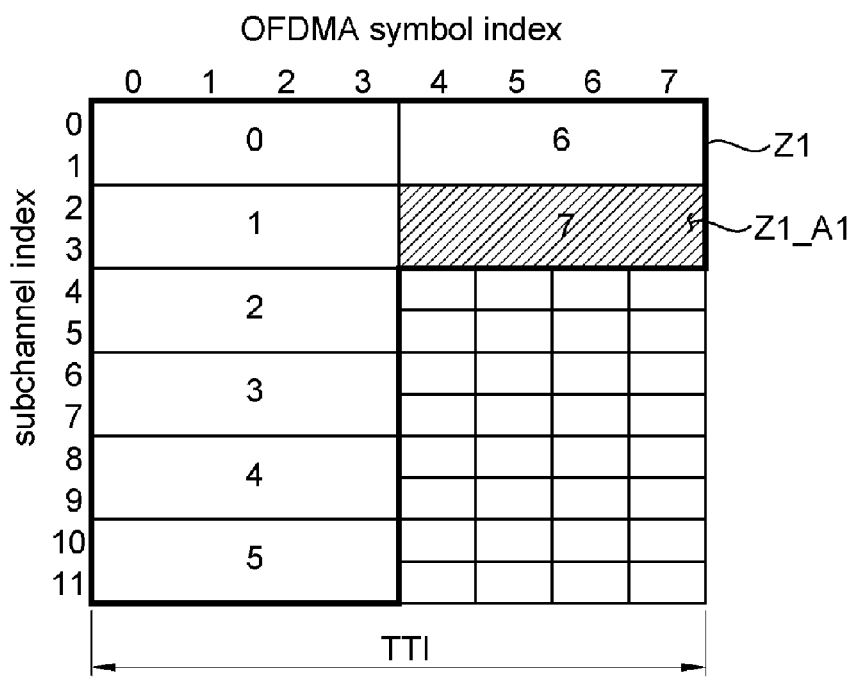

[Fig. 15]
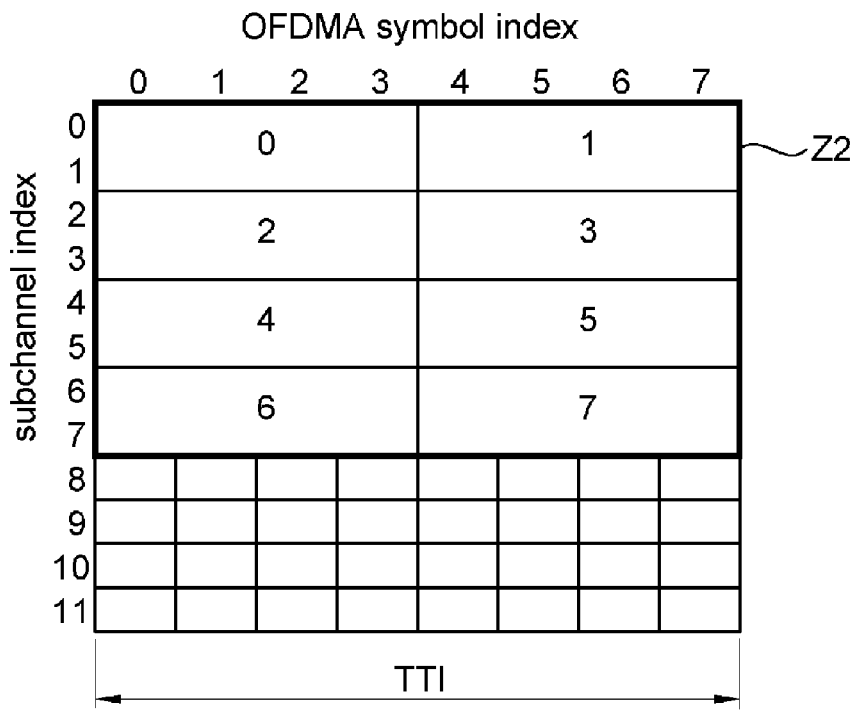
[Fig. 16]
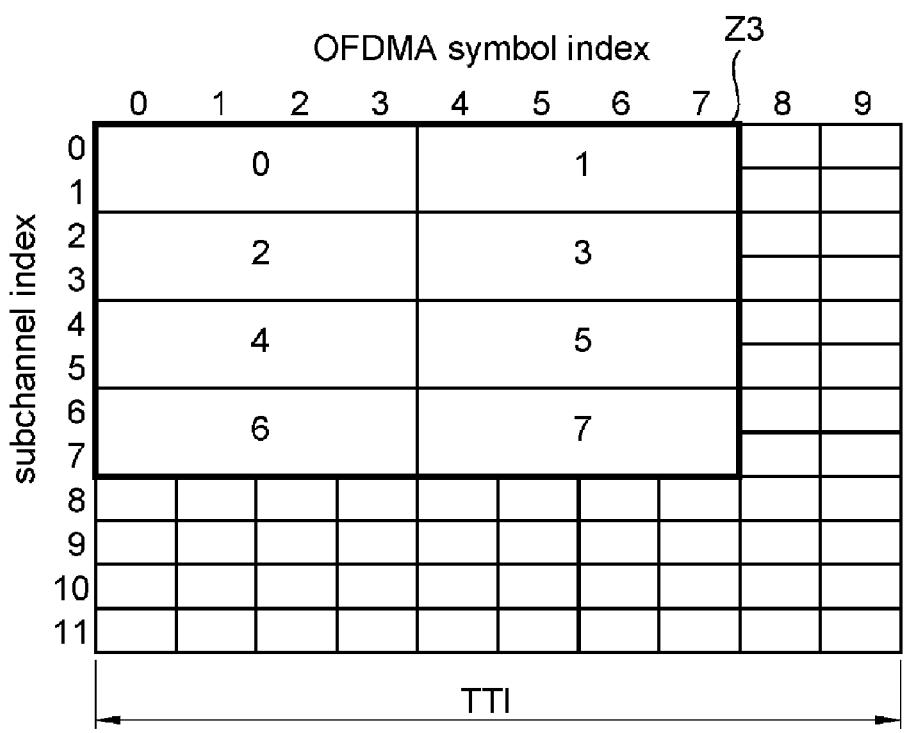

[Fig. 19]
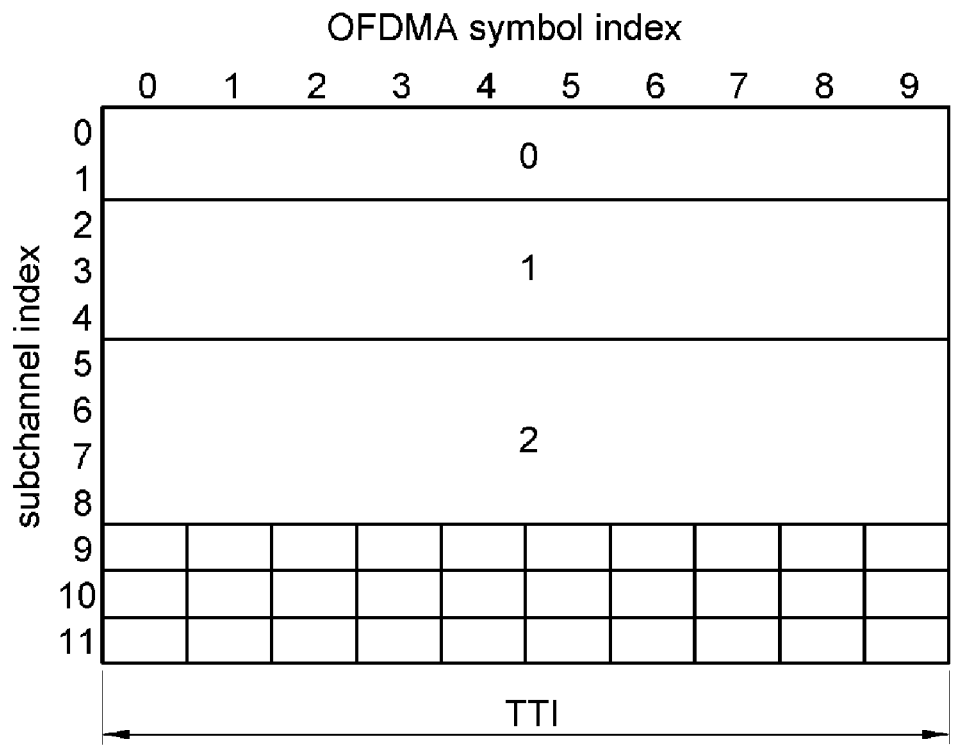
[Fig. 20]
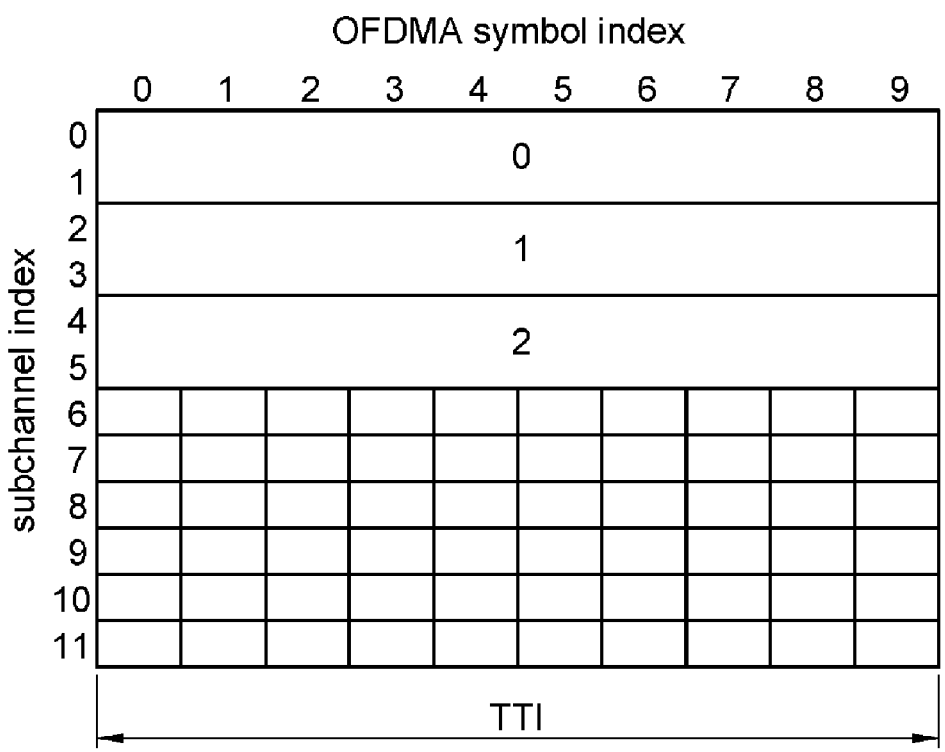

[Fig. 21]
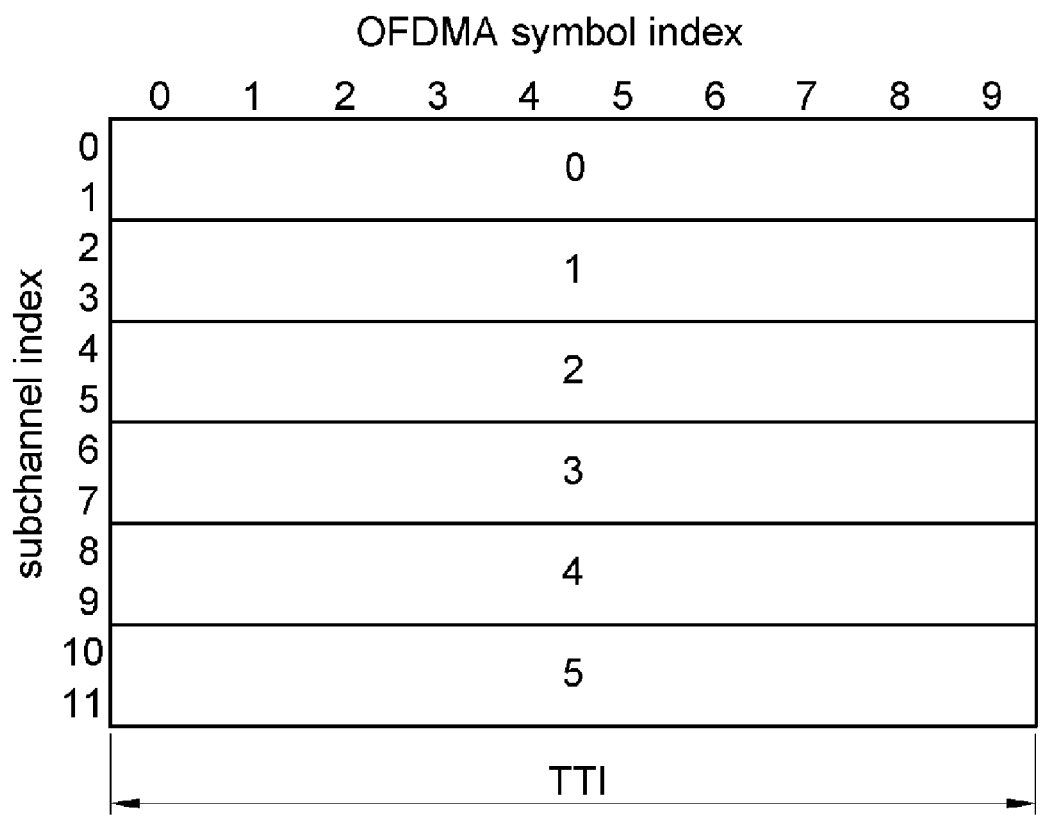

METHOD FOR ALLOCATING RADIO RESOURCE IN WIRELESS COMMUNICATION SYSTEM AND METHOD FOR TRANSMITTING OR RECEIVING DATA USING THE SAME

This application is a National Stage Entry of International Application No. PCT/KR2008/004045, filed on Jul. 9, 2008, and claims priority to Korean Patent Application Nos. 10-2007-0070763, filed Jul. 13, 2007 and 10-2007-0111979, filed Nov. 5, 2007, and U.S. Provisional Application Nos. 60/970,530, filed Sep. 6, 2007, 60/977,643, filed Oct. 4, 2007, and 60/978,736, filed Oct. 9, 2007, each of which are hereby incorporated by reference in their entireties as if fully set forth herein.

TECHNICAL FIELD

The present invention relates to wireless communications, and more particularly, to a method for allocating a radio resource in a wireless communication system.

BACKGROUND ART

Wireless communication systems are widely used to provide various types of communications. For example, voice and/or data are provided by the wireless communication systems. A conventional wireless communication system provides multiple users with one or more shared resources. For example, the wireless communication system can use various multiple access schemes such as code division multiple access (CDMA), time division multiple access (TDMA), and frequency division multiple access (FDMA).

An orthogonal frequency division multiplexing (OFDM) scheme uses a plurality of orthogonal sub-carriers. Further, the OFDM scheme uses an orthogonality between inverse fast Fourier transform (IFFT) and fast Fourier transform (FFT). A transmitter transmits data by performing IFFT. A receiver restores original data by performing FFT on a received signal. The transmitter uses IFFT to combine the plurality of sub-carriers, and the receiver uses FFT to split the plurality of sub-carriers. According to the OFDM scheme, complexity of the receiver can be reduced in a frequency selective fading environment of a broadband channel, and spectral efficiency can be improved through selective scheduling in a frequency domain by utilizing channel characteristics which are different from one subcarrier to another. An orthogonal frequency division multiple access (OFDMA) scheme is an OFDM-based multiple access scheme. According to the OFDMA scheme, a radio resource can be more efficiently used by allocating different subcarriers to multiple users.

The wireless communication system employs one or more base stations (BSs) having a coverage area. A typical BS can transmit multiple data streams for broadcast, multicast, and/or unicast services. The data stream denotes a stream of data that can be independently received by a user equipment (UE). In addition, the UE can also transmit the data stream to the BS or another UE.

Hereinafter, downlink is defined as transmission from the BS to the UE, and uplink is defined as transmission from the UE to the BS.

In general, the BS schedules radio resources. An uplink resource is a radio resource transmitted in uplink. A downlink resource is a radio resource transmitted in downlink. In downlink, the BS informs the UE of the downlink resource allocated to the data stream, and the UE receives the data stream through the downlink resource. In uplink, the BS informs the UE of the uplink resource allocated to the data stream, and the UE transmits the data stream through the uplink resource.

Radio resource allocation information has to be occasionally transmitted to the UE. This is because the UE should know the radio resource allocation information to transmit or receive the data stream. The radio resource allocation information is a control signal. The radio resource is transmitted through a dedicated control channel or a common control channel. The dedicated control channel denotes a control channel for at least one specific UE. The common control channel denotes a control channel for all UEs in the coverage area.

The radio resource may be allocated in a different size according to an amount of data streams to be transmitted, a channel condition, or a quality of service (QoS). When the amount of data streams increases, more radio resources have to be allocated. For effective use of the limited radio resources, the radio resources need to be adaptively allocated for data streams which change variously.

Accordingly, there is a need for a method capable of increasing efficiency of limited radio resources by adaptively allocating the radio resources in a wireless communication system.

DISCLOSURE OF INVENTION

Technical Problem

The present invention provides a resource allocation method for adaptively allocating a radio resource to improve efficiency of the radio resource and a method for transmitting or receiving data by using the resource allocation method.

Technical Solution

According to an aspect of the present invention, a method for allocating a radio resource in a wireless communication system comprises defining a plurality of resource regions within a frame, a resource region comprising at least one orthogonal frequency division multiple access (OFDMA) symbol and at least one subchannel, configuring radio resource allocation information indicating which resource region selected from the plurality of resource regions is allocated to a UE, the radio resource allocation information comprising at least one resource region identifier (ID), a resource region ID indicating a resource region selected from the plurality of resource regions, and transmitting the radio resource allocation information to the UE.

According to another aspect of the present invention, a method for transmitting or receiving data by using a resource region including at least one OFDMA symbol and at least one subchannel, the method comprises receiving radio resource allocation information comprising at least one resource region ID, a resource region ID indicating the resource region selected from a plurality of resource regions, the plurality of resource regions is included in a permutation zone and is defined in information of the permutation zone, and transmitting or receiving data through the resource region.

Advantageous Effects

A resource region of a frame can be adaptively divided so that data streams with various sizes can be effectively allocated. Therefore, limited radio resources can be effectively used.

BRIEF DESCRIPTION OF THE DRAWINGS

FIG. 1 shows a wireless communication system.
FIG. 2 shows an example of a frame.

FIG. 3 shows an example of radio resource allocation using the frame of FIG. 2.

FIG. 4 shows another example of radio resource allocation using the frame of FIG. 2.

FIG. 5 shows another example of a frame.

FIG. 6 shows an example of radio resource allocation using the frame of FIG. 5.

FIG. 7 shows an example of radio resource allocation using the frame of FIG. 5 according to an embodiment of the present invention.

FIG. 8 shows an example of radio resource allocation using the frame of FIG. 5 according to another embodiment of the present invention.

FIG. 9 shows a frame structure for explaining a method for allocating a radio resource according to an embodiment of the present invention.

FIG. 10 shows a frame structure for explaining a method for allocating a radio resource according to another embodiment of the present invention.

FIG. 11 shows a frame structure for explaining a method for allocating a radio resource according to another embodiment of the present invention.

FIG. 12 shows a frame structure for explaining a method for allocating a radio resource according to another embodiment of the present invention.

FIG. 13 shows a frame structure for explaining a method for allocating a radio resource according to another embodiment of the present invention.

FIG. 14 shows a frame structure for explaining a method for allocating a radio resource according to another embodiment of the present invention.

FIG. 15 shows a frame structure for explaining a method for allocating a radio resource according to another embodiment of the present invention.

FIG. 16 shows a frame structure for explaining a method for allocating a radio resource according to another embodiment of the present invention.

FIG. 17 shows a frame structure for explaining a method for allocating a radio resource according to another embodiment of the present invention.

FIG. 18 shows a frame structure for explaining a method for allocating a radio resource according to another embodiment of the present invention.

FIG. 19 shows a frame structure for explaining a method for allocating a radio resource according to another embodiment of the present invention.

FIG. 20 shows a frame structure for explaining a method for allocating a radio resource according to another embodiment of the present invention.

FIG. 21 shows a frame structure for explaining a method for allocating a radio resource according to another embodiment of the present invention.

MODE FOR THE INVENTION

FIG. 1 shows a wireless communication system. The wireless communication system can be widely deployed to provide a variety of communication services, such as voices, packet data, etc.

Referring to FIG. 1, the wireless communication system includes a base station (BS) 20 and at least one user equipment (UE) 10. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

There is no restriction on a multiple access scheme applied to the wireless communication system. Thus, various multiple access schemes can be used such as code division multiple access (CDMA), time division multiple access (TDMA), frequency division multiple access (FDMA), and orthogonal frequency division multiple access (OFDMA). To facilitate explanations, the following description will focus on an OFDMA-based wireless communication system.

The present invention can be applied to uplink transmission or downlink transmission. Hereinafter, an uplink frame denotes a frame in uplink transmission and a downlink frame denotes a frame in downlink transmission. A frame may include an uplink frame and a downlink frame. The frame may use a time division duplex (TDD) scheme in which the uplink frame and the downlink frame is transmitted at different time or may use a frequency division duplex (FDD) scheme in which the uplink frame and the downlink frame is transmitted by using different frequencies.

FIG. 2 shows an example of a frame.

Referring to FIG. 2, a horizontal axis represents an OFDMA symbol index in a time domain, and a vertical axis represents a subchannel index in a frequency domain. A subchannel is a basic unit for dividing a frequency resource and includes a plurality of subcarriers. The frame includes a plurality of OFDMA symbols in the time domain and a plurality of subcarriers in the frequency domain. A transmission time interval (TTI) represents a time required for transmitting one frame.

Herein, one frame includes N+1 OFDMA symbols and K+1 subchannels, where N and K are arbitrary natural numbers. However, there is no limit in the number of OFDMA symbols and the number of subchannels. The OFDMA symbol index and the subchannel index may change variously.

For an UE, at least one resource element can be allocated on a grid in one 2-dimensional frame. The resource element is a minimum basic unit of a radio resource that can be allocated to the UE. For example, the resource element may include one OFDMA symbol and one subchannel. In this case, the resource element has a constant size within one frame, and a BS allocates the resource element to the UE by varying the number of resource elements.

For example, radio resource allocation information may include offsets and the number of resource elements. In addition, through the radio resource allocation information, the UE can know the radio resource allocated to the UE. The offset is a value indicating a start location of the allocated radio resource.

The radio resource allocation information for allocating the radio resource to the UE can be defined as shown in Table 1 below.

TABLE 1

| Name | Number of bits | Description |
| --- | --- | --- |
| OFDMA symbol offset | 8 | Offset from start symbol of frame |
| Subchannel offset | 7 | Offset from $0^{th}$ subchannel |
| Number of OFDMA symbols | 7 | — |
| Number of subchannels | 7 | — |

'OFDMA symbol offset' denotes an OFDMA symbol index at which allocation starts. 'Subchannel offset' denotes a subchannel index at which allocation starts. 'Number of OFDMA symbols' denotes the number of allocated OFDMA symbols. 'Number of subchannels' denotes the number of allocated subchannels. Herein, the name and the number of bits are shown in Table 1 above for exemplary purposes only, and thus the present invention is not limited thereto. The name and the number of bits may vary depending on systems.

The BS generates the radio resource allocation information including the offsets and the number of resource elements having a predetermined size. The BS transmits the generated radio resource allocation information to the UE. The radio resource, having an arbitrary location and an arbitrary size in one frame, can be allocated to the UE according to the offsets and the number of radio elements. Thus, it can be said that radio resource allocation has a great degree of freedom. That is, the radio resource can be flexibly allocated to the UE according to a size of the required radio resource. However, according to this method, a large amount of the radio resource allocation information has to be informed to the UE. In the example of Table 1 above, the radio resource allocation information is required at least 29 bits in order to inform the radio resource allocated to one UE.

FIG. 3 shows an example of radio resource allocation using the frame of FIG. 2.

Referring to FIG. 3, an allocated region A1 in the frame is allocated to an arbitrary UE. Hereinafter, the allocated region denotes a radio resource allocated to the UE. A size and location of the allocated region A1 are shown for exemplary purposes only. The allocated region A1 can be represented by a resource element set including at least one resource element. The allocated region A1 can be represented by offsets and the number of resource elements. When the allocated region A1 includes 24 resource elements, according to Table 1 above, the radio resource allocation information can be represented as "OFDMA symbol offset=2, Subchannel offset=3, Number of OFDMA symbols=4, Number of subchannels=6".

FIG. 4 shows another example of radio resource allocation using the frame of FIG. 2. It is assumed that the frame of FIG. 2 has OFDMA symbol indices 0 to 9 and subchannel indices 0 to 9.

Referring to FIG. 4, within the frame, a duration may be sequentially assigned to each of a plurality of UEs so as to inform an allocated region. That is, radio resource allocation information can be represented by using only the duration. The duration denotes a resource element or a slot which ranges from a start point, at which the allocated region is initially allocated to the UE, to a last point at which the allocation ends. Hereinafter, the slot is a minimum unit for allocating data, and is defined with a time and a subchannel. The definition of slot can vary depending on which permutation is applied. Hereinafter, the permutation denotes mapping of a logical subchannel onto a physical subcarrier. Examples of the permutation include full usage of subchannels (FUSC), partial usage of subchannels (PUSC), band-adaptive modulation and coding (AMC), etc. The FUSC denotes a permutation in which each subchannel is mapped to physical subcarriers over the entire bandwidth. The PUSC denotes a permutation in which each physical channel is divided into clusters of 14 subcarriers and each subchannel is mapped to the clusters. The AMC denotes a permutation in which physical subcarriers are grouped into not-overlapping groups of contiguous 9 sub-carriers and subchannel is mapped to the group. In the FUSC, one slot may be defined with one OFDMA and one subchannel. In the PUSC, one slot may be defined with two OFDMA symbols and one subchannel. In the band-AMC, one slot may be defined with one OFDMA symbol and one subchannel, or two OFDMA symbols and one subchannel, or three OFDMA symbols and one subchannel, or 6 OFDMA symbols and one subchannel.

The radio resource allocation information for allocating the radio resource to the UE can be defined as shown in Table 2 below by using only the duration. The name and the number of bits are shown in Table 2 below for exemplary purposes only, and thus may vary depending on the arrangement or the number of resource regions.

TABLE 2

| Name | Number of bits | Description |
| --- | --- | --- |
| Duration | 6 | The number of slots (or resource elements) |

Assume that allocated regions A2_U1, A2_U2, and A2_U3 are allocated to three UEs U1, U2, and U3 within a frame. The allocated region A2_U1 for the first UE U1 includes 10 resource elements. The allocated region A2_U2 for the second UE U2 includes 14 resource elements. The allocated region A2_U3 for the third UE U3 includes 8 resource elements. If it is assumed that a unit of duration assigned to each UE is a slot in the PUSC, radio resource allocation information for the first UE U1 can be represented as "duration=5", radio resource allocation information for the second UE U2 can be represented as "duration=7", and radio resource allocation information for the third UE U3 can be represented as "duration=4". As such, the radio resource allocation information can be simply represented only with several bits.

In a case where the BS and the UE know a start point of the allocated region A2_U1 of the first UE U1, as described above, only the duration can be known to the UE. An end point of the allocated region A2_U1 of the first UE U1 is subsequently followed by a start point of the allocated region A2_U2 of the second UE U2. The end point of allocated region A2_U2 of the second UE U2 is subsequently followed by a start point of the allocated region A2_U3 of the third UE U3.

If the UE does not know the start point of the allocated region A2_U1 of the first UE U1 or if there is a need to inform an OFDMA symbol and subchannel at which the allocated region begins in a preamble, the BS may inform the allocated region to the UE by providing offset along with the duration. For example, the radio resource allocation information of the first UE U1 can be represented as "OFDMA symbol offset=0, Subchannel offset=0, duration=5". The radio resource allocation information of the second UE U2 can be represented as "OFDMA symbol offset=0, Subchannel offset=1, duration=7". The radio resource allocation information of the third UE U3 can be represented as "OFDMA symbol offset=4, Subchannel offset=2, duration=4". Of course, the allocated region of the second UE U2 is continued from the allocated region of the first UE U1, and the allocated region of the third UE U3 is continued from the allocated region of the second UE U2. Therefore, except for the offset, only the duration can be provided to the radio resource allocation information.

For another example, the radio resource allocation information can be informed by representing an offset as a sum of durations. That is, the offset is the sum of previously allocated durations. The radio resource allocation information of the first UE U1 can be represented as "Offset=0, duration=5". The radio resource allocation information of the second UE U2 can be represented as "Offset=5, duration=7". The radio resource allocation information of the third UE U3 can be represented as "Offset=12, duration=4". When contiguous resources are allocated to a plurality of UEs, only one offset may be used to inform the radio resource allocation information. When the radio resource allocation information of the second UE U2 and the radio resource allocation information of the third UE U3 are informed, "offset=5" may be first informed, and then "duration=7" and "duration=4" may be respectively informed to the second UE and the third UE.

In a case where only the duration is provided to the radio resource allocation information, a size of the radio resource allocation information decreases. However, a degree of freedom decreases in radio resource allocation. In addition, each UE has to also know radio resource allocation information of other UEs by correctly decoding the information in order to know its radio resource allocation information.

Although it has been described that a radio resource is allocated first on a time axis according to a duration assigned to a UE, the radio resource may be allocated first on a frequency axis.

FIG. 5 shows another example of a frame.

Referring to FIG. 5, a horizontal axis represents an OFDMA symbol index in a time domain, and a vertical axis represents a subchannel index in a frequency domain. The frame includes a plurality of resource regions.

The resource region is a basic unit of a radio resource that can be allocated to a UE. Unlike a resource element, the resource region may vary in size within one frame. A definition on the resource region can be informed to the UE through a downlink channel descriptor (DCD) or an uplink channel descriptor (UCD) transmitted through a common control channel. The DCD describes a downlink burst profile. The UCD describes an uplink burst profile.

The resource region can be defined as shown in Table 3 below.

TABLE 3

| Name | Value |
| --- | --- |
| Region definition | Num_region (6 bits for the number of region, 2 bits reserved,For(i=0; i<Num_region; I++){OFDMA symbol offset(8 bits),Subchannel offset(6 bits),No. OFDMA symbols(8 bits),No. subchannels(6 bits),},Padding bits to align boundary of byte. |

In Table 3 above, 'Num_region' denotes the number of resource regions. The number of resource regions may be in association with a resource region identifier (ID) which is an identifier for the resource region. The name and the number of bits are shown in Table 3 above for exemplary purposes only, and thus the present invention is not limited thereto. The name and the number of bits may vary depending on systems.

Meanwhile, the resource region may be defined by assigning a slot ID to a slot defined in a specific permutation. Table 4 below shows the definition on the slot ID.

TABLE 4

| Name | Type(1 byte) | Length | Value |
| --- | --- | --- | --- |
| Slot ID definition | TBD | 1 | The number of bits for slot ID(4 bits) |

The slot ID may be allocated first on either a frequency axis or a time axis. The number of bits for defining the slot ID may vary depending on the number of slots.

Herein, one frame includes 8 resource regions, and each resource region ID is allocated first on the frequency axis. The number of resource regions and the arrangement of the resource region ID are not limited thereto, and thus can be arbitrarily determined.

Information on the size and location of each resource region may be defined by the BS and may be informed to the UE. That is, the BS and the UE know each other about the definition on the resource region. For example, for a resource region having a resource region ID 3, the UE and the BS share size and location information such as "OFDMA symbol offset=4, Subchannel offset=0, Number of OFDMA symbols=4, Number of subchannels=5".

Radio resource allocation information indicates which resource region selected from the plurality of resource regions is allocated to a UE. The radio resource allocation information comprises at least one resource region ID. The resource region ID indicates a resource region selected from the plurality of resource regions.

Radio resource allocation information for allocating a radio resource to the UE can be represented only with a resource region ID. This can be defined as shown in Table 5 below.

TABLE 5

| Name | Number of bits | Description |
| --- | --- | --- |
| Resource Region ID | 8 | Index to the region defined in frame |

The radio resource allocation information can be known by informing at least one resource region ID to the UE. In the example of Table 5 above, only 8 bits are used to transmit the radio resource allocation information including the resource region ID. The name and the number of bits are shown in Table 5 above for exemplary purposes only, and thus they may vary depending on the arrangement and the number of the resource regions.

As such, according to the resource region ID, at least one resource region having an arbitrary location and an arbitration size within one frame can be allocated to the UE.

FIG. 6 shows an example of radio resource allocation using the frame of FIG. 5.

Referring to FIG. 6, an allocated region A3 is allocated to a UE within the frame. Herein, a resource region having a resource region ID 3 is allocated to the allocated region A3. The location or the number of resource regions indicated by the allocated region A3 is shown for exemplary purposes only. The allocated region A3 may be represented by a resource region ID. The allocated region A3 includes one resource region, and according to Table 5 above, radio resource allocation information may be represented as "Resource Region ID=3".

FIG. 7 shows an example of radio resource allocation using the frame of FIG. 5 according to an embodiment of the present invention.

Referring to FIG. 7, an allocated region A4 is allocated to a UE within the frame. Herein, resource regions having resource region IDs 3, 4, and 5 are allocated to the allocated region A4. The location or the number of resource regions indicated by the allocated region A4 is shown for exemplary purposes only. The allocated region A4 may be represented by a resource region ID and a duration. In this case, the duration indicates the number of resource regions included in the allocated region. That is, the duration indicates the number of consecutive resource regions allocated to the UE. The duration may have priority on either a frequency axis or a time axis. The duration may have priority according to an order of resource region ID or not.

The resource region ID and the duration can be defined as shown in Table 6 below.

TABLE 6

| Name | Number of bits | Description |
| --- | --- | --- |
| Resource Region ID | 6 | Index to the region defined in frame |
| Duration | 6 | The number of resource regions |

Referring to Table 6 above, for the allocated region A4 including the resource regions having resource region IDs 3, 4, and 5, radio resource allocation information can be represented as Resource Region ID=3, Duration=3". The radio resource allocation information can be known by informing at least one resource region ID and the duration to the UE. The number of bits for the radio resource allocation information is 12 bits in total, that is, 6 bits for the resource region ID and 6 bits for the duration. The name and the number of bits are shown in Table 6 above for exemplary purposes only, and thus may vary depending on the arrangement and the number of resource regions.

FIG. 8 shows an example of radio resource allocation using the frame of FIG. 5 according to another embodiment of the present invention.

Referring to FIG. 8, an allocated region A5 can be represented by a resource region ID and a duration D. The duration D may be an exponent of 2 (i.e., 2D) of the number of resource regions included in the allocated region. The resource region ID and the duration can be defined as shown in Table 7 below.

TABLE 7

| Name | Number of bits | Description |
| --- | --- | --- |
| Resource Region ID | 8 | Index to the region defined in frame |
| Duration | 3 | The exponent of 2 indicate the number of resource regions |

For example, if radio resource allocation information is represented as "Resource Region ID=3, Duration=2", resource regions having resource region IDs 3, 4, 5, and 6 are allocated to the resource region A5. The number of bits of the radio resource allocation information is 11 bits in total, that is, 8 bits for the resource region ID and 3 bit for the duration. When the number of resource regions included in the allocated region is represented with the exponent of 2, the number of bits used to transmit the radio resource allocation information is reduced in comparison with the case when the number of resource regions is directly represented by the duration. The name and the number of bits are shown in Table 7 above for exemplary purposes only, and thus may vary depending on the arrangement and the number of resource regions.

In the examples of Table 6 and Table 7 above, 'duration' is described as the number of resource regions, or the number of resource regions indicated by the exponent of 2. However, this is for exemplary purposes only, and thus, any description is possible as long as it is pre-defined so that the number of resource regions can be calculated based on an arbitrary number defined in the 'duration'. For example, the allocated resource region may be represented with a multiple of 2, a multiple of 3, etc., with respect to the duration D.

Although it has been described in FIGS. 7 and 8 that the resource region is allocated first on the frequency axis according to the duration assigned to the UE, the resource region may be allocated first on the time axis.

FIG. 9 shows a frame structure for explaining a method for allocating a radio resource according to an embodiment of the present invention.

Referring to FIG. 9, one frame includes 9 OFDMA symbols and 12 subchannels. The number of resource regions is 12. Resource region IDs are 0 to 11. The resource regions can be defined as shown in Table 3 above. The resource region IDs can be assigned first on a frequency axis. In this case, when a resource region ID and a duration are assigned to a UE, resource regions may be allocated first on a time axis. In a case where the resource regions are allocated first on the time axis, if the number of resource regions allocated according to the duration is greater than the number of resource regions allocated on the time axis, that is, allocation is not finished until the end of time domain, then the resource regions are allocated again on the time axis starting from allocatable adjacent resource regions on the frequency axis.

For example, according to Table 6 above, if radio resource allocation information is represented as "Resource Region ID=0, Duration=4", resource regions having resource region IDs 0, 4, 8, and 1 are allocated to an allocated region A6. In addition, according to Table 7 above, if the radio resource allocation information is represented as "Resource Region ID=0, Duration=2", the resource regions having resource region IDs 0, 4, 8, and 1 are allocated to the allocated region A6. This is for exemplary purposes only, and thus the arrangement or the number of resource regions may vary.

The radio resource allocation information can include an optional indicator which indicates whether the resource regions will be allocated first on the frequency axis or the time axis. The optional indicator may be represented with 1 bit. The optional indicator can inform the UE of whether the resource regions have been allocated first on the time axis or the frequency axis. In general, for a frequency diversity gain, it may be preferable to allocate the resource regions first on the frequency domain. However, similar to a band-AMC permutation, if contiguous physical subcarriers are used as a unit of allocation, resource region allocation on the time axis may be advantageous over resource region allocation on the frequency axis. Therefore, the BS and the UE may implicitly know that the resource region allocation is achieved according to the permutation in such a manner that if a permutation for diversity is used similarly to the PUSC and the FUSC, the resource region is allocated first on the frequency axis, and if a localized permutation for link adaptation is used similarly to the band-AMC, the resource regions are allocated first on the time axis FIG. 10 shows a frame structure for explaining a method for allocating a radio resource according to another embodiment of the present invention.

Referring to FIG. 10, an allocated region A7 is allocated to a UE within a frame. Herein, 7 resource regions are allocated to the allocated region A7. The allocated region A7 includes the 7 resource regions having resource region IDs 0, 1, 2, 3, 8, 9, and 10. The location or the number of the resource regions included in the allocated region A7 is shown for exemplary purposes only.

In this case, radio resource allocation information may have a bitmap format. If one frame includes 16 resource regions, the location and the number of the resource regions can be represented by using a 16 bits bitmap. In the bitmap, one bit matches to one resource region. The location and the number of the resource regions are indicated in such a manner that, if a corresponding resource region is allocated, '1' is set in the bitmap, and otherwise, '0' is set. The radio resource allocation information for the allocated region A7 is expressed as (0000011100001111)$_2$ in the bitmap format. Herein, (.)$_2$ denotes a binary number, a most significant bit (MSB) of the bitmap corresponds to a resource region having a resource region ID 15, and a least significant bit (LSB) thereof corresponds to a resource region having a resource region ID 0. The resource regions matching to the bits of the bitmap are shown for exemplary purposes only, and thus may be differently determined.

FIG. 11 shows a frame structure for explaining a method for allocating a radio resource according to another embodiment of the present invention.

Referring to FIG. 11, one frame includes 9 OFDMA symbols and 12 subchannels. In addition, the number of resource regions is 12, and resource region IDs are 0 to 11. The resource regions can be defined as described in Table 3 above. The resource region IDs can be assigned first on a frequency axis.

A first allocated region A8 is allocated to the resource regions having the resource regions IDs 0 to 4, and a second allocated region A9 is allocated to the resource region having the resource region ID 5. The first allocated region A8 and the second allocated region A9 may be either resource regions allocated to different UEs or resource regions through which different pieces of data are allocated to the same UE.

Radio resource allocation information for the first allocated region A8 can be represented by only a first resource region ID (i.e., ID=0). That is, the radio resource allocation information of the first allocated region A8 may be represented as "Resource Region ID=0". In this case, the first resource region (i.e., ID=0) indicates a start point of the first allocated region A8, wherein the first allocated region A8 ranges from the first resource region (ID=0) to the resource region (ID=4) located prior to the resource region (ID=5) of the second allocated region A9. The UE can know the entire range of the first allocated region A8 allocated to the UE itself by evaluating the first resource region ID and the resource region ID of the second allocated region A9. This is only exemplary purposes only, and thus the arrangement and the number of allocated regions and the number of resource regions may be differently determined. In addition, the entire allocated regions can be represented by one arbitrary resource region ID in the allocated regions.

FIG. 12 shows a frame structure for explaining a method for allocating a radio resource according to another embodiment of the present invention.

Referring to FIG. 12, one frame includes 60 resource regions. In addition, resource region IDs are 0 to 59, and the resource regions are allocated first on a time axis. Although the resource regions have the same size herein, they may have different sizes.

A first allocated region A10 is allocated to regions having resource regions IDs 0 to 19, a second allocated region A11 is allocated to regions having resource region IDs 20 to 35, and a third allocated region A12 is allocated to regions having resource IDs 36 to 59. The first allocated region A10, the second allocated region A11, and the third allocated region A12 may be regions allocated to different UEs or regions through which different pieces of data is allocated to the same UE.

Radio resource allocation information for each allocated region can be represented by a last resource region ID of each allocated region. That is, the radio resource allocation information of the first allocated region A10 can be represented as "Resource Region ID=19", the radio resource allocation information of the second allocated region A11 can be represented as "Resource Region ID=35", and the radio resource allocation information of the third allocated region A12 can be represented as "Resource Region ID=59".

That is, when the allocated region forms a rectangle, radio resource allocation information can represent the allocated region by indicating a resource region positioned at the edge of the rectangle. The resource region positioned at the edge of the rectangle can be the first or the last resource of the allocated region.

Table 8 below shows a case where an allocated region is represented only with a last resource ID of the allocated region.

TABLE 8

| Syntax | Size | Notes |
| --- | --- | --- |
| Resource Region ID | 8 | Index to the DL region defined in DL region definition TLV in DCD. Allocated regions are all available region from the first Region_ID to the Region_ID |

Even if the radio resource allocation information is represented only with the last resource region ID of each allocated region, the UE can know a range of the region allocated to the UE itself. That is, the UE can know that the first allocated region A10 ranges from the first resource region (ID=0) to the last resource region (ID=19) of the first allocated region, the second allocated region A11 ranges from the resource region (ID=20) located next to the last resource region of the first allocated region to the last resource region (ID=35) of the second allocated region, and the third allocated region A12 ranges from the resource region (ID=36) located next to the last resource region of the second allocated region to the last resource region (ID=59) of the third allocated region.

FIG. 13 shows a frame structure for explaining a method for allocating a radio resource according to another embodiment of the present invention.

Referring to FIG. 13, one frame includes 60 resource regions. In addition, resource region IDs are 0 to 59, and the resource regions are allocated first on a frequency axis. Although the resource regions have the same size herein, they may have different sizes.

A first allocated region A13 is allocated to regions having subchannel indices 0 to 4, a second allocated region A14 is allocated to regions having subchannel indices 5 to 8, and a third allocated region A15 is allocated to regions having subchannel indices 9 to 14. The first allocated region A13, the second allocated region A14, and the third allocated region A15 may be regions allocated to different UEs or regions through which different pieces of data is allocated to the same UE.

Radio resource allocation information for each allocated region can be represented by a first resource region ID and a last resource region ID of each allocated region. In this case, each allocated region is a rectangular region. The radio resource allocation information of the first allocated region A13 can be represented as "First Resource Region ID=0, Last Resource Region ID=49", the radio resource allocation information of the second allocated region A14 can be represented as "First Resource Region ID=5, Last Resource Region ID=53", and the radio resource allocation information of the third allocated region A15 can be represented as "First Resource Region ID=9, Last Resource Region ID=59".

Table 9 below shows a case where an allocated region is represented by a first resource region ID and a last resource region ID of the allocated region.

TABLE 9

| Syntax | Size | Notes |
| --- | --- | --- |
| First Resource Region ID | 6 | Index to the DL region defined in DL region definition TLV in DCD |
| Last Resource Region ID | 6 | Index to the DL region defined in DL region definition TLV in DCD |

Since the allocated region is the rectangular region, the UE can know a range of the allocated region assigned to the UE itself even if only the first resource region ID and the last resource region ID are known.

Meanwhile, if an allocated region is identified in a slot unit by assigning a slot ID to each slot, the radio resource allocation information for the rectangular allocated region can be represented by a first slot ID and a last slot ID of each allocated region. For example, if the resource regions is corresponded to the slot, the radio resource allocation information of the first allocated region A13 can be represented as "First Slot ID=0, Last Slot ID=49", the radio resource allocation information of the second allocated region A14 can be represented as "First Slot ID=5, Last Slot ID=53", and the radio resource allocation information of the third allocated region A15 can be represented as "First Slot ID=9, Last Slot ID=59".

Table 10 below shows a case where an allocated region is represented by a first slot ID and a last slot ID of the allocated region.

TABLE 10

| Syntax | Size | Notes |
| --- | --- | --- |
| First Slot ID | 10 | Index to the DL Slot |
| Last Slot ID | 10 | Index to the DL Slot |

Although it has been explained in Table 8 to Table 10 under the assumption of a downlink (DL) scenario, the radio resource allocation information can be represented in the same manner also in an uplink (UL) scenario. In addition, the name and the number of bits described in Table 8 to Table 10 above are shown for exemplary purposes only, and thus may vary depending on the arrangement and the number of resource regions (or slots).

FIG. 14 shows a frame structure for explaining a method for allocating a radio resource according to another embodiment of the present invention.

Referring to FIG. 14, a frame can be divided into different permutation zones according to a permutation applied in one frame. That is, zones applied with different permutations can be determined within one frame. One permutation zone can include at least one resource region.

The frame of FIG. 14 includes 8 OFDMA symbols and 12 subchannels, and a new permutation zone Z1 includes 8 resource regions. The resource regions included in the permutation zone Z1 have resource region IDs 0 to 7. A resource region Z1_A1 having a resource region ID 7 is assigned to one UE in the permutation zone Z1. The remaining zones other than the permutation zone Z1 may be applied with another permutation different from that used in the permutation zone Z1.

The location and size of the permutation zone Z1, and the location and size of each resource region included therein can be represented with permutation zone information. The permutation zone information defines a start location of the new permutation zone and also defines the location and size of each resource region included in the permutation zone. The permutation zone information is associated with the size of the resource region on time domain and frequency domain. The permutation zone information is a control signal and can be transmitted to the UE through a dedicated control channel or a shared control channel. The permutation zone information may define a permutation zone within a DL resource or a UL resource.

Table 11 below shows an example of the permutation zone information that defines the start location of the new permutation zone.

TABLE 11

| Syntax | Size(bit) | Notes |
| --- | --- | --- |
| OFDMA symbol offset | 8 | Denotes the start of the zone(counting from the frame preamble and starting from 0) |
| Permutation | 3 | 0b00: PUSC permutation<br>0b01: FUSC permutation<br>0b10: Optional FUSC permutation<br>0b11: AMC |

An OFDMA symbol offset is used to specify the start location of the new permutation zone and defines a permutation applied to the permutation zone. This is for exemplary purposes only, and thus the name and the number of bits may vary depending on systems, and the applied permutation may arbitrarily change according to UL, DL, or systems.

Table 12 below shows an example of the permutation zone information that defines the resource regions included in the permutation zone.

TABLE 12

| Name | Value |
| --- | --- |
| Region definition | Num_region = number of region, For(i=0; i<Num_region; I++){ OFDMA symbol offset, Subchannel offset, No. OFDMA symbols, No. subchannels} |

'OFDMA symbol offset', 'Subchannel offset', 'No. OFDMA symbols', and 'No. subchannels' can be used to define a range of the permutation zone Z1 and the location and size of each resource region. Herein, the 'OFDMA symbol offset' indicates an offset from an OFDMA symbol at which a new permutation starts. The 'subchannel offset' is an index indicating an offset from a subchannel at which the permutation zone Z1 starts. The 'No. OFDMA symbols' indicates the number of OFDMA symbols assigned to one resource region. The 'No. channels' indicates the number of subchannels assigned to one resource region.

Resource regions are allocated first on a frequency axis within the range of the permutation zone Z1. Thus, resource regions having resource region IDs 0 to 5 are allocated on the frequency axis and resource regions having resource region IDs 6 and 7 are assigned to next OFDMA symbols. However, the present invention is not limited thereto, and thus the resource regions may be allocated first on a time axis within the range of the permutation zone Z1.

A resource region Z1_A1 having a resource region ID 7 and included in the permutation zone Z1 can be represented as "OFDMA symbol offset=4, Subchannel offset=2, No. OFDMA symbols=4, No. subchannels=2" by using the definition of Table 12 above.

Table 13 below shows another example of the permutation zone information that defines the resource regions included in the permutation zone.

TABLE 13

| Name | Value |
| --- | --- |
| Region definition | Num_region = number of region, For(i=0; i<Num_region; I++){ Slot in time offset (=Slot duration offset), Subchannel offset, No. slot in time, No. subchannels (=No. slot in frequency)} |

A range of the permutation zone Z1 and a size of each resource region included in the range can be defined with 'Slot in time offset', 'subchannel offset', 'No. slot in time', and 'No. subchannels'. Herein, the 'slot in time offset' indicates an offset of a slot located in a time axis from a time point at which a new permutation starts. The 'No. slot in time' indicates how many slots are assigned to one resource region in the time domain. The 'No. subchannels' indicates the number of subchannels assigned to one resource region. The 'subchannel offset' is an index indicating an offset from a subchannel at which the permutation zone Z1 starts. 'No. slot in frequency' may be used to indicate how many slots are included along a frequency axis.

In case of a PUSC permutation, the resource region Z1_A1 having the resource region ID 7 can be represented as "Slot in time offset=2, Subchannel offset=2, No. slot in time=2, No. subchannels=2" by using the definition of Table 13 above.

Table 14 below shows another example of the permutation zone information that defines the resource regions included in the permutation zone. Herein, all resource regions included in the permutation zone have the same size.

TABLE 14

| Name | Value |
| --- | --- |
| Region definition | Num_region = number of regions, No. OFDMA symbols, No. subchannels |

If all resource regions included in the permutation zone have the same size, a range of the permutation zone Z1 and a size of each resource region included therein can be defined with 'No. OFDMA symbols' and 'No. subchannels'. Herein, 'Num_region' indicates the number of resource regions included in the permutation zone Z1.

The permutation zone Z1 can be represented as "Num_region=8, No. OFDMA symbols=4, No. subchannels=2" by using the definition of Table 14 above.

Table 15 below shows another example of the permutation zone information that defines the resource regions included in the permutation zone. Herein, all resource regions included in the permutation zone have the same size.

TABLE 15

| Name | Value |
| --- | --- |
| Region definition | Num_region = number of regions, No. slot in time, No. subchannels |

If all resource regions included in the permutation zone have the same size, the permutation zone Z1 can be represented by 'No. slot in time' and 'No. subchannels'.

When using the PUSC permutation, the permutation zone Z1 can be represented as "Num_region=8, No. slot in time=2, No. subchannels=2" by using the definition of Table 15 above.

As such, if all resource regions included in the permutation zone have the same size, the permutation zone information can be transmitted with a less number of bits in comparison with a case where both the location and the size of each resource region have to be informed.

In case of Table 14 and Table 15 above, the number of resource regions can be automatically calculated according to a size of one frame (or permutation zone) without informing the number of resource regions.

Meanwhile, since a slot size is defined in a specific permutation zone, each permutation zone can be defined with the number of slots. Table 16 below shows definition of each permutation zone according to a slot.

TABLE 16

| Name | Type(1 byte) | Length | Value |
| --- | --- | --- | --- |
| DL PUSC region Definition | TBD | 2 | Number of slots in time(4 bits), Number of slots in frequency(4 bits), Number of bits for Region ID(4 bits) |
| DL FUSC regionDefinition | | 2 | Number of slots in time(4 bits), Number of slots in frequency(4 bits), Number of bits for Region ID(4 bits) |
| DL AMC regionDefinition | | 2 | Number of slots in time(4 bits), Number of slots in frequency(4 bits), Number of bits for Region ID(4 bits) |

'Number of slots in time' indicates how many slots are included along a time axis. 'Number of slots in frequency' indicates how many slots are included along a frequency axis. Since the slot size is defined for each permutation in downlink, each permutation zone can be represented by the 'Number of slots in time' and the 'Number of slots in frequency'. Each permutation zone may also be defined in uplink with the 'Number of slots in time' and the 'Number of slots in frequency' in the same manner.

In Table 16 above, the number of bits for 'Region ID' may be automatically calculated according to the size of one frame (or permutation zone) without informing of the number of bits.

FIG. 15 shows a frame structure for explaining a method for allocating a radio resource according to another embodiment of the present invention.

Referring to FIG. 15, similarly to FIG. 14, a frame includes 8 OFDMA symbols and 12 subchannels. In addition, a new permutation zone Z2 includes 8 resource regions, and resource region IDs are 0 to 7. In this case, the resource regions included in the permutation zone Z2 are allocated first on a time axis. Resource regions having resource region IDs 0 and 1 are allocated first on the time axis within a range of the permutation zone Z2. Then, resource regions having resource region IDs 2 and 3 are allocated on the time axis in a next frequency region. In this manner, allocation is carried out for the remaining resource regions having resource region IDs 4 to 7.

FIG. 15 is different from FIG. 14 in terms of a direction in which the resource regions included in the permutation zone Z2 are allocated. The permutation zone Z2 can be represented with the permutation zone information defined in Table 12 to Table 16 above.

Whether the resource regions will be allocated first on the time axis or the frequency axis within the permutation zone Z2 can be predetermined. Alternatively, a preferable allocation direction of the resource regions may be reported by a BS to a UE by representing the allocation direction with one index. This index can be represented with one bit.

FIG. 16 shows a frame structure for explaining a method for allocating a radio resource according to another embodiment of the present invention.

Referring to FIG. 16, a frame includes 10 OFDMA symbols and 12 subchannels. In addition, a new permutation zone Z3 includes 8 resource regions, and resource region IDs are 0 to 7.

If permutation zone information is represented as "Num_region=8, No. OFDMA symbols=4, No. subchannels=2" by using the definition of Table 14 above and then is allocated first on a time axis, one resource region cannot be allocated to regions corresponding to OFDMA symbol indices 8 and 9. In this case, the regions corresponding to OFDMA symbol indices 8 and 9 are excluded when the permutation zone Z3 is allocated. That is, if last remaining portions of the frame are smaller in size than one resource region of the permutation zone Z3, those portions are excluded from permutation zone Z3 when the permutation zone Z3 is allocated.

This is for exemplary purposes only, and thus the permutation zone information can be represented by using any one of Table 12 to 16 above. There is no limit in the number of resource regions included in the permutation zone Z3, and a location and size of the permutation zone Z3 can change variously. In addition, the frame size is also shown exemplary purposes only, and thus the last remaining portions of the frame can be excluded in the allocation of the permutation zone Z3 if the last remaining portions of the frame are smaller in size than one resource region of the permutation zone Z3 because other types of permutations are used or because other resource regions are allocated with priority. Even in a case where the resource regions are allocated first on a frequency axis, the last remaining portions can be excluded in the allocation of the permutation zone Z3 if the remaining portions are smaller in size than the resource region to be allocated.

Figures 17, 18:
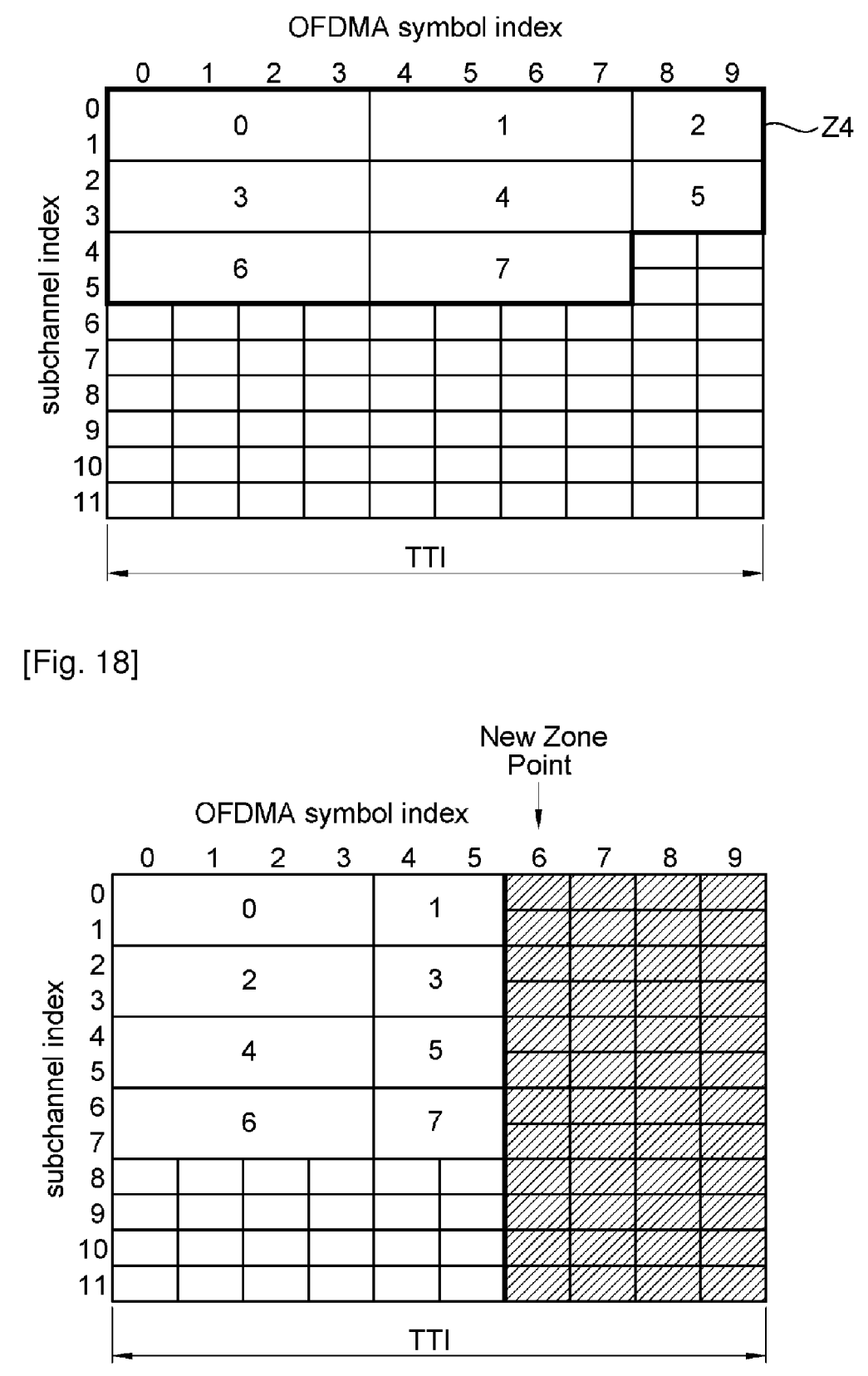

FIG. 17 shows a frame structure for explaining a method for allocating a radio resource according to another embodiment of the present invention.

Referring to FIG. 17, a frame includes 10 OFDMA symbols and 12 subframes. In addition, a new permutation zone Z4 includes 8 resource regions, and resource region IDs are 0 to 7.

If permutation zone information is represented as "Num_region=8, No. OFDMA symbols=4, No. subchannels=2" by using the definition of Table 14 above and then is allocated first on a time axis. Regions corresponding to OFDMA symbol indices 8 and 9 can be included in the permutation zone Z4 even if the regions have smaller size than the other resource region of permutation Z4. That is, resource regions having resource region IDs 2 and 5 have a smaller size than other resource regions included in the permutation zone Z4.

This is for exemplary purposes only, and thus the permutation zone information can be represented by using any one of Table 12 to Table 16 above. There is no limit in the number of resource regions included in the permutation zone Z4, and the location and size of the permutation zone Z4 can change variously. In addition, the frame size is also shown exemplary purposes only. The permutation zone Z4 can include resource regions having different sizes because other types of permutations are used or because other resource regions are allocated with priority. Even in a case where the resource regions included in the permutation zone are allocated first on a frequency axis, the permutation zone Z4 can include resource regions having smaller sizes due to remaining portions.

FIG. 18 shows a frame structure for explaining a method for allocating a radio resource according to another embodiment of the present invention.

Referring to FIG. 18, a frame can be divided into a plurality of resource regions having different definitions. The divided resource regions may be changed in size according to permutation zones or resource regions which will be defined later.

For example, similarly to FIG. 16, if it is assumed that the resource regions or the permutation zones of the frame are first divided and thereafter a new zone point of a new permutation zone is represented as "OFDMA symbol offset=6", then the first divided resource regions having resource region IDs 1, 3, 5, and 7 change in size due to the new permutation zone. In this case, the resource regions of the resource region IDs 1, 3, 5, and 7 may be allocated to a UE without altering the changed size or may not be allocated thereto. If a size of user data to be transmitted to the UE can be carried on a resource region having the changed size, the data can be used without alteration. Alternatively, other suitable data may be carried and transmitted on a resource region having the changed size.

FIG. 19 shows a frame structure for explaining a method for allocating a radio resource according to another embodiment of the present invention.

Referring to FIG. 19, a frame includes 10 OFDMA symbols, 12 subchannels, and resource regions having resource region IDs 0 to 2. This is for exemplary purposes only, and thus the size of the frame as well as the size and number of resource regions included in the frame can change variously.

The resource regions included in the frame can be represented with the number of resource regions, a subchannel offset, and the number of subchannels. Table 17 below shows an example of defining resource regions.

TABLE 17

| Name | Value |
| --- | --- |
| Region definition | Num_region = number of region, For(i=0; i<Num_region; I++){Subchannel offset, No. subchannels} |

The resource regions having resource regions IDs 0 and 2 can be defined as "Num_region=3, Subchannel offset=0, No. subchannels=2, Subchannel offset=2, No. subchannels=3, Subchannel offset=5, No. subchannels=4". A time-axis offset, the number of OFDMA symbols, or the like can use values provided by other control information or can include all regions that can be allocated along a time axis. For example, as shown in Table 11 above, information indicating a start of a new permutation zone, i.e., "OFDMA symbol offset=m", can be used to define the number of OFDMA symbols in the time axis.

If the resource regions are allocated starting from a first region of a first allocatable region in the frame, the resource regions can be represented with the number of resource regions and the number of subchannels included in each resource region within the frame. Table 18 below shows another example of defining resource regions.

TABLE 18

| Name | Value |
| --- | --- |
| Region definition | Num_region = number of region, For(i=0; i<Num_region; I++){No. subchannels} |

The resource regions having resource region IDs 0 to 2 can be defined as "Num_region=3, No. subchannels=2, No. subchannels=3, No. subchannels=4". A time-axis offset, the number of OFDMA symbols, or the like can use values provided by other control information or can include all regions that can be allocated along the time axis.

FIG. 20 shows a frame structure for explaining a method for allocating a radio resource according to another embodiment of the present invention.

Referring to FIG. 20, a frame includes 10 OFDMA symbols, 12 subchannels, and 3 resource regions having resource region IDs 0 to 2. This is for exemplary purposes only, and thus the size of the frame as well as the size and number of resource regions included in the frame can change variously.

If the resource regions are allocated starting from a first region of a first allocatable region in the frame and the resource regions have the same size, the resource regions can be represented with the number of resource regions and the number of subchannels included in each resource region. Table 19 below shows another example of defining resource regions.

TABLE 19

| Name | Value |
|---|---|
| Region definition | Num_region = number of region, No. subchannels |

The resource regions having resource region IDs 0 to 2 can be defined as "Num_region=3, No. subchannels=2". A time-axis offset, the number of OFDMA symbols, or the like can use values provided by other control information or can include all regions that can be allocated along the time axis.

FIG. 21 shows a frame structure for explaining a method for allocating a radio resource according to another embodiment of the present invention.

Referring to FIG. 21, a frame includes 10 OFDMA symbols, 12 subchannels, and 6 resource regions having resource region IDs 0 to 5. This is for exemplary purposes only, and thus the size of the frame as well as the size and number of resource regions included in the frame can change variously.

If a region in which resource regions are allocated with the same size is predetermined in the frame, the resource regions included in the region can be represented only with the number of subchannels. Table 20 below shows another example of defining resource regions.

TABLE 20

| Name | Value |
|---|---|
| Region definition | No. subchannels |

The resource regions having resource region IDs 0 to 5 can be defined as "No. subchannels=2". A time-axis offset, the number of OFDMA symbols, or the like can use values provided by other control information or can include all regions that can be allocated along a time axis.

As described above, a BS can define a resource region of a frame and transmit information (i.e., a resource region ID, a duration, a bitmap, etc.) to a UE as radio resource allocation information. Through the radio resource allocation information, the UE can know the resource region allocated to the UE and thus can transmit and receive a data stream. The resource region may be defined differently in a plurality of frames. Whenever the definition on the resource region is modified, the BS has to inform the UE of the modified definition.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

While the present invention has been particularly shown and described with reference to exemplary embodiments thereof, it will be understood by those skilled in the art that various changes in form and details may be made therein without departing from the spirit and scope of the invention as defined by the appended claims. For example, an OFDMA symbol offset, a subchannel offset, a slot time offset, etc., may be determined according to a specific time point other than a start point of a preamble (or a permutation zone) and also may be newly determined whenever a resource region of each frame is allocated. Therefore, the scope of the invention is defined not by the detailed description of the invention but by the appended claims, and all differences within the scope will be construed as being included in the present invention.

The invention claimed is:

1. A method for allocating a radio resource in a wireless communication system, the method comprising:
    defining a plurality of resource regions within a frame, a resource region comprising at least one orthogonal frequency division multiple access (OFDMA) symbol and at least one subchannel;
    configuring radio resource allocation information indicating which resource region selected from the plurality of resource regions is allocated to a user equipment (UE), and transmitting the radio resource allocation information to the UE,
    wherein the radio resource allocation information comprises at least one resource region identifier (ID), a resource region ID indicating a resource region selected from the plurality of resource regions;
    a duration indicating the number of consecutive resource regions allocated to the UE; and
    an optional indicator indicating whether resource region identifiers of the plurality of resource regions are indexed first on the frequency axis or the time axis, wherein the consecutive resource regions have consecutive resource region IDs.

2. The method of claim 1, wherein the resource regions allocated to the UE form a rectangle, and the resource region ID indicates a resource region positioned at the edge of the rectangle.

3. The method of claim 1, wherein the radio resource allocation information comprises a resource region ID for the first resource region allocated to the UE.

4. The method of claim 1, wherein the radio resource allocation information comprises a resource region ID for the first resource region allocated to the UE and another resource region ID for the first resource region allocated to another UE.

5. The method of claim 1, wherein the frame is divided into at least one permutation zone, the radio resource allocation information comprises permutation zone information including:
    an OFDMA symbol offset indicating the start location of a permutation zone in time domain;
    a subchannel offset indicating the start location of the permutation zone in frequency domain;
    the number of resource regions in the permutation zone; and
    a size of one resource region included in the permutation zone.

6. A method for transmitting or receiving data by using a resource region including at least one OFDMA symbol and at least one subchannel, the method comprising:
    receiving radio resource allocation information; and
    transmitting or receiving data through at least one resource region indicated by the radio resource allocation information, wherein the radio resource allocation information comprises at least one resource region identifier (ID), a resource region ID indicating a resource region selected from the plurality of resource regions;

a duration indicating the number of consecutive resource regions allocated to a user equipment (UE); and an optional indicator indicating whether resource region identifiers of the plurality of resource regions are indexed first on the frequency axis or the time axis, wherein the consecutive resource regions have consecutive resource region IDs.

7. The method of claim 6, wherein the plurality of resource regions are included in a permutation zone and the permutation zone is defined via permutation zone information included in the radio resource allocation information.

8. The method of claim 7, wherein the permutation zone information includes an OFDMA symbol offset indicating the start location of a permutation zone in time domain;

a subchannel offset indicating the start location of the permutation zone in frequency domain;

the number of resource regions in the permutation zone; and a size of one resource region included in the permutation zone.

* * * * *